US009255182B2

(12) United States Patent
Duerig et al.

(10) Patent No.: US 9,255,182 B2
(45) Date of Patent: Feb. 9, 2016

(54) DATA STORAGE MEDIUM AND METHOD FOR HIGH DENSITY DATA STORAGE

(75) Inventors: Urs T. Duerig, Rueschlikon (CH); Jane Elizabeth Frommer, San Jose, CA (US); Bernd Walter Gotsmann, Horgen (CH); Erik Christopher Hagberg, Evansville, IN (US); James Lupton Hedrick, Pleasanton, CA (US); Armin W. Knoll, Adliswil (CH); Teddie Peregrino Magbitang, San Jose, CA (US); Robert Dennis Miller, San Jose, CA (US); Russell Clayton Pratt, Los Gatos, CA (US); Charles Gordon Wade, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1344 days.

(21) Appl. No.: 12/056,446

(22) Filed: Mar. 27, 2008

(65) Prior Publication Data

US 2008/0175135 A1    Jul. 24, 2008

Related U.S. Application Data

(63) Continuation of application No. 11/468,829, filed on Aug. 31, 2006, now abandoned.

(51) Int. Cl.
*C08G 73/10*    (2006.01)

(52) U.S. Cl.
CPC .......... *C08G 73/1085* (2013.01); *C08G 73/101* (2013.01); *C08G 73/1064* (2013.01)

(58) Field of Classification Search
CPC .......... C08G 73/10; C08L 79/08; C07C 65/28
USPC .................................. 369/126, 154; 528/310
See application file for complete search history.

(56) References Cited

U.S. PATENT DOCUMENTS

| | | | |
|---|---|---|---|
| 4,038,320 A | 7/1977 | Arnold et al. |
| 4,276,407 A | 6/1981 | Bilow et al. |
| 4,537,947 A | 8/1985 | D'Alelio |
| 5,326,643 A | 7/1994 | Adamopoulos et al. |
| 5,412,066 A | 5/1995 | Hergenrother et al. |
| 5,470,945 A | 11/1995 | Markle et al. |
| 5,567,800 A | 10/1996 | Hergenrother et al. |
| 5,599,582 A | 2/1997 | Adamopoulos et al. |
| 5,606,014 A | 2/1997 | Connell et al. |
| 5,681,967 A | 10/1997 | Hergenrother et al. |
| 5,714,566 A | 2/1998 | Lubowtiz et al. |
| 5,760,168 A | 6/1998 | Hergenrother et al. |
| 6,124,035 A | 9/2000 | Connell et al. |
| 6,136,949 A | 10/2000 | Earls et al. |
| 6,207,762 B1 | 3/2001 | Kobayashi et al. |
| 6,288,188 B1 | 9/2001 | Godschalx et al. |
| 6,333,391 B1 | 12/2001 | Laycock et al. |
| 6,344,523 B1 | 2/2002 | Hawthorne et al. |
| 6,346,296 B1 | 2/2002 | McCarthy et al. |
| 6,350,817 B1 | 2/2002 | Connell et al. |
| 6,441,099 B1 | 8/2002 | Connell et al. |
| 6,506,536 B2 | 1/2003 | Pappas et al. |
| 6,803,447 B2 | 10/2004 | Janssen et al. |
| 6,899,992 B2 | 5/2005 | Huang et al. |
| 6,902,860 B2 | 6/2005 | Asawa et al. |
| 6,911,296 B2 | 6/2005 | Pappas et al. |
| 6,979,464 B2 | 12/2005 | Gutowska |
| 8,102,753 B2 * | 1/2012 | Duerig et al. ................. 369/154 |
| 8,129,496 B2 | 3/2012 | Duerig et al. |
| 8,792,318 B2 | 7/2014 | Duerig et al. |
| 2003/0114598 A1 | 6/2003 | Li et al. |
| 2003/0215654 A1 | 11/2003 | Moriyama et al. |
| 2004/0034190 A1 | 2/2004 | Janssen et al. |
| 2004/0046155 A1 | 3/2004 | Li et al. |
| 2004/0198850 A1 | 10/2004 | Connor et al. |
| 2005/0037194 A1 | 2/2005 | Greene et al. |
| 2005/0047307 A1 | 3/2005 | Frommer et al. |
| 2005/0050258 A1 | 3/2005 | Frommer et al. |
| 2007/0195682 A1 | 8/2007 | Duerig et al. |
| 2007/0196645 A1 | 8/2007 | Duerig et al. |
| 2008/0076903 A1 | 3/2008 | Duerig et al. |
| 2008/0219135 A1 | 9/2008 | Duerig et al. |
| 2009/0100553 A1 | 4/2009 | Despont et al. |

FOREIGN PATENT DOCUMENTS

EP     05405018.2     1/2005

OTHER PUBLICATIONS

Vettiger et al.; The "Millipede"—More than one thousand tips for future AFM data storage; IBM J Res. Develop., vol. 44, No. 3; May 2000; pp. 323-340.
Office Action (Mail Date Jun. 10, 2009) for U.S. Appl. No. 11/468,829, Filing Date Aug. 31, 2006.
Vettiger et al.; The "Millipede"—Nanotechnology Entering Data Storage; IEEE Transactions on Nanotechnology, vol. 1, No. 1; Mar. 2002; pp. 39-55.
Vettiger et al.; The Millipede—More than one thousand tips for future AFM data storage; IBM Journal of Research and Development, vol. 44, No. 3; May 2000; pp. 323-340.
Office Action (Mail Date Jun. 9, 2009) for U.S. Appl. No. 11/626,431, filed Jan. 24, 2007.
Response to Office Action (Mail Date Jun. 9, 2009) for U.S. Appl. No. 11/626,431, filed Jan. 24, 2007.

(Continued)

*Primary Examiner* — Gregory Listvoyb
(74) *Attorney, Agent, or Firm* — Schmeiser, Olsen & Watts

(57) ABSTRACT

A composition of matter for a recording medium in atomic force data storage devices. The composition includes polyimide oligomers having covalently bonded monomers forming a backbone, the oligomer thermally stable to at least 400° C.; one or more covalent bonding cross-linking moieties incorporated into the polyimide oligomer; and one or more hydrogen bonding cross-linking moieties incorporated into the polyimide oligomer. The covalent and hydrogen bonding cross-linking of the polyimide oligomers may be tuned to match thermal and force parameters required in read-write-erase cycles.

14 Claims, 4 Drawing Sheets

(56) References Cited

OTHER PUBLICATIONS

Office Action (Mail Date Nov. 20, 2009) for U.S. Appl. No. 11/626,431, filed Jan. 24, 2007.
Notice of Abandonment (Mail Date Jun. 21, 2010) for U.S. Appl. No. 11/626,431, filed Jan. 24, 2007.
Office Action (Mail Date Feb. 22, 2010) for U.S. Appl. No. 11/358,774, filed Feb. 21, 2006.
Response (dated May 18, 2010) to Office Action (Mail Date Feb. 22, 2010) for U.S. Appl. No. 11/358,774, filed Feb. 21, 2006.
Office Action (Mail Date Jul. 27, 2010) for U.S. Appl. No. 11/358,774, filed Feb. 21, 2006.
Response (dated Sep. 8, 2010) to Office Action (Mail Date Jul. 27, 2010) for U.S. Appl. No. 11/358,774, filed Feb. 21, 2006.
Office Action (Mail Date Oct. 8, 2010) for U.S. Appl. No. 11/358,774, filed Feb. 21, 2006.
Response (dated Dec. 29, 2010) to Office Action (Mail Date Oct. 8, 2010) for U.S. Appl. No. 11/358,774, filed Feb. 21, 2006.
Office Action (Mail Date Jun. 23, 2011) for U.S. Appl. No. 11/358,774, filed Feb. 21, 2006.
Response (dated Aug. 23, 2011) to Office Action (Mail Date Jun. 23, 2011) for U.S. Appl. No. 11/358,774, filed Feb. 21, 2006.
Notice of Allowance (Mail Date Sep. 8, 2011) for U.S. Appl. No. 11/358,774, filed Feb. 21, 2006.
Office Action (Mail Date Sep. 27, 2010) for U.S. Appl. No. 12/056,412, filed Mar. 27, 2008.
Response (dated Dec. 13, 2010) to Office Action (Mail Date Sep. 27, 2010) for U.S. Appl. No. 12/056,412, filed Mar. 27, 2008.
Office Action (Mail Date Mar. 1, 2011) for U.S. Appl. No. 12/056,412, filed Mar. 27, 2008.
Response (dated May 24, 2011) Office Action (Mail Date Mar. 1, 2011) for U.S. Appl. No. 12/056,412, filed Mar. 27, 2008.
Office Action (Mail Date Aug. 8, 2011) for U.S. Appl. No. 12/056,412, filed Mar. 27, 2008.
Request for Continued Examination and Amendment in Response (dated Sep. 29, 2011) to Office Action (Mail Date Aug. 3, 2011) for U.S. Appl. No. 12/056,412, filed Mar. 27, 2008.
U.S. Appl. No. 13/275,441, filed Oct. 18, 2011.
Office Action (Mail Date Jun. 10, 2009) for U.S. Appl. No. 11/468,829, filed Aug. 31, 2006.
U.S. Appl. No. 13/275,473, filed Oct. 18, 2011.
Amendment (dated Sep. 8, 2009) in response to Office Action (Mail Date Jun. 10, 2009) for U.S. Appl. No. 11/468,829, filed Aug. 31, 2006.
Final Office Action (Mail Date Nov. 19, 2009) for U.S. Appl. No. 11/468,829, filed Aug. 31, 2006.
Notice of Abandonment (Mail Date Jun. 21, 2010) for U.S. Appl. No. 11/468,829, filed Aug. 31, 2006.
U.S. Appl. No. 13/234,889, filed Jan. 9, 2012.

\* cited by examiner

DATA STORAGE MEDIUM AND METHOD FOR HIGH DENSITY DATA STORAGE

This application is a continuation of U.S. patent application Ser. No. 11/468,829 filed on Aug. 8, 2006, now abandoned.

FIELD OF THE INVENTION

The present invention relates to the field of high-density data storage and more specifically to compositions for a data storage medium, a data storage method and a data storage system using the data storage compositions

BACKGROUND OF THE INVENTION

Current data storage methodologies operate in the micron regime. In an effort to store ever more information in ever-smaller spaces, data storage density has been increasing. As data storage size increases and density increases and integrated circuit densities increase, there is a developing need for data storage and imaging methodologies that operate in the nanometer regime.

SUMMARY OF THE INVENTION

A first aspect of the present invention is a composition of matter, comprising: polyimide oligomers comprising covalently bonded monomers, the monomers forming a backbone, the polyimide oligomers thermally stable to at least 400° C.; one or more covalent bonding cross-linking moieties incorporated into the polyimide oligomers; and one or more hydrogen bonding cross-linking moieties incorporated into the polyimide oligomers.

A second aspect of the present invention is a method, comprising: pushing a probe, heated to at least 100° C., into a cross-linked resin layer formed by curing a layer of the composition of the first aspect; and removing the probe from the resin layer, resulting in formation of a deformed region in the resin layer.

A third aspect of the present invention is a method, comprising: bringing a thermal-mechanical probe into proximity with a cross-linked resin layer multiple times to induce deformed regions at points in the resin layer, the resin layer formed by curing a layer of the composition of the first aspect, the thermal mechanical probe heating the points in the resin layer above about 100° C. to write information in the resin layer.

A fourth aspect of the present invention is a data storage device, comprising: a recording medium for storing data, the recording medium comprising a resin layer overlying a substrate, the data represented by topographical states of the resin layer, the resin layer comprising a thermally cured layer of the composition of the first aspect; a read-write head for reading and writing data to the recording medium, the read-write head having one or more thermo-mechanical probes, each of the thermo-mechanical probes including an electrical resistive heating region; and means for scanning the read-write head across a surface of the recording medium.

A fifth aspect of the present invention is a composition of matter comprising: a backbone structured as $E_1\text{-}(A_1\text{-}A_2\text{-}A_3\text{-}\ldots\text{-}A_N)\text{-}E_2$, wherein N is between about 10 and about 45, wherein $A_1\text{-}A_2\text{-}A_3\text{-}\ldots\text{-}A_N$ is a linearly connected sequence of N covalently bonded monomeric backbone units, wherein each of $A_1, A_2, A_3 \ldots A_N$ is independently either a hydrogen bonding cross-linking moiety, a covalently bonding cross-linking moiety or a non-cross-linking moiety and E1 and E2 are terminal cross-linking moieties.

A sixth aspect of the present invention is a method, comprising: bringing a thermal-mechanical probe into proximity with a cross-linked resin layer multiple times to induce deformed regions at points in the resin layer, the resin layer formed by curing a layer of the composition of the fifth aspect, the thermal mechanical probe heating the points in the resin layer above about 100° C. to write information in the resin layer.

A seventh aspect of the present invention is a data storage device, comprising: a recording medium for storing data, the recording medium comprising a resin layer overlying a substrate, the data represented by topographical states of the resin layer, the resin layer comprising a thermally cured layer of the composition of the fifth aspect; a read-write head for reading and writing data to the recording medium, the read-write head having one or more thermo-mechanical probes, each of the thermo-mechanical probes including an electrical resistive heating region; and means for scanning the read-write head across a surface of the recording medium.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1A:
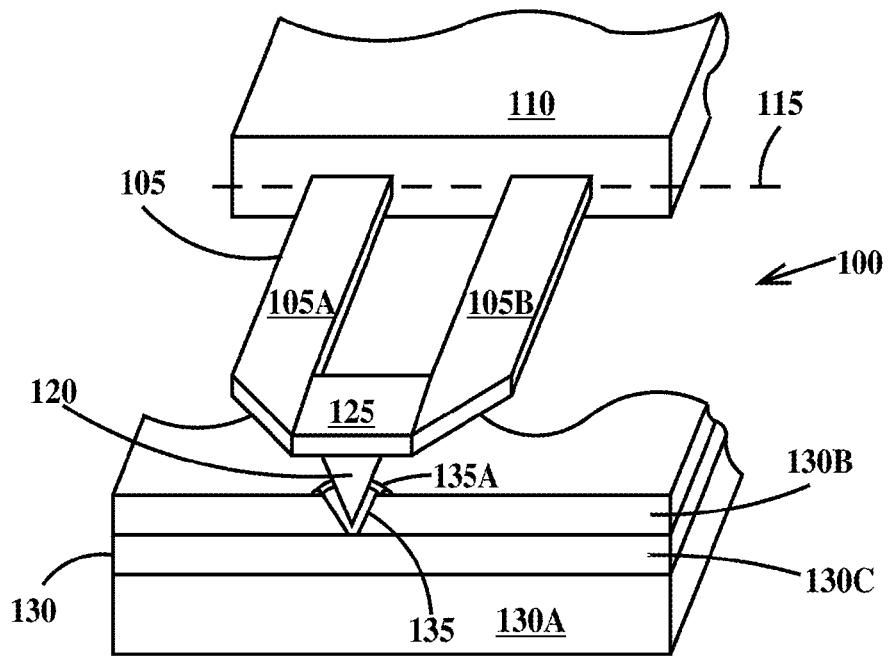
FIGS. 1A through 1C illustrate the structure and operation of a tip assembly for a data storage device including the data storage medium according to the embodiments of the present invention.
Figure 1B:
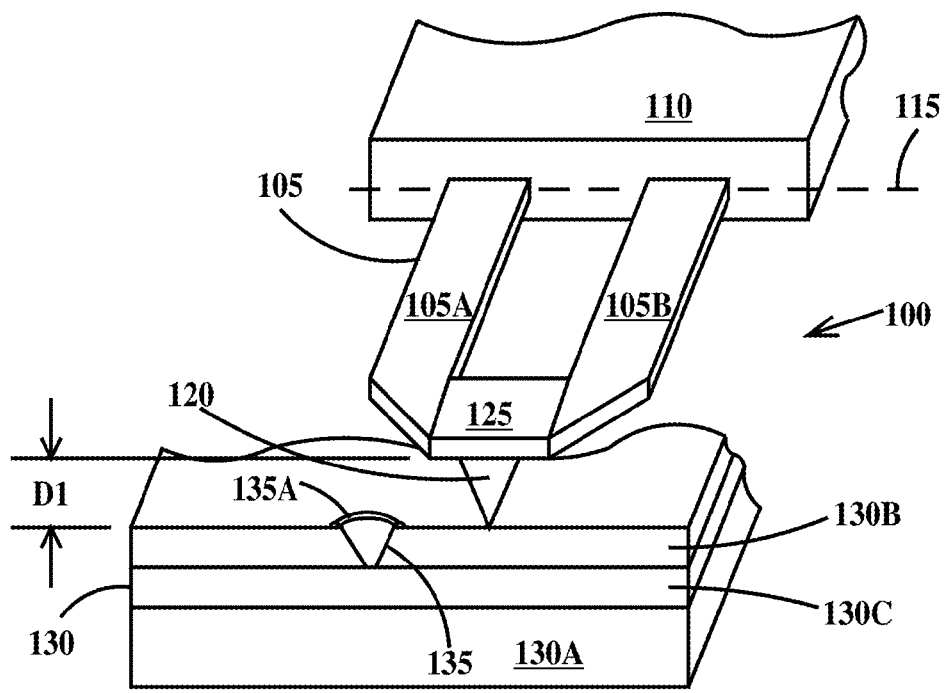
Figure 1C:
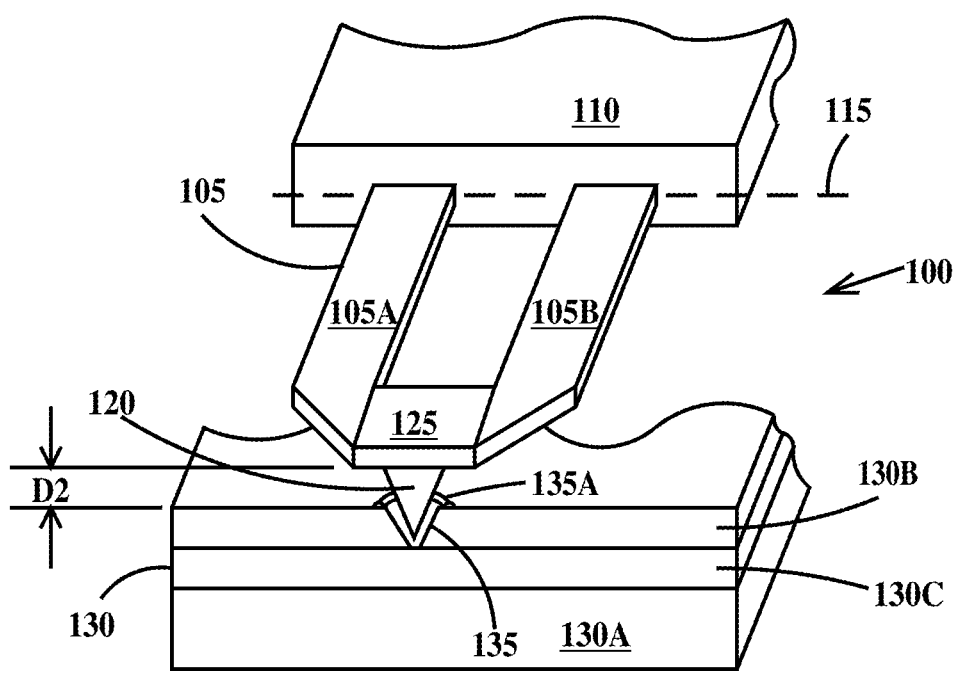

FIGS. 1A through 1C illustrate the structure and operation of a tip assembly 100 for a data storage device including the data storage medium according to the embodiments of the present invention. In FIG. 1A, probe tip assembly 100 includes a U-shaped cantilever 105 having flexible members 105A and 105B connected to a support structure 110. Flexing of members 105A and 105B provides for substantial pivotal motion of cantilever 105 about a pivot axis 115. Cantilever 105 includes a tip 120 fixed to a heater 125 connected between flexing members 105A and 105B. Flexing members 105A and 105B and heater 125 are electrically conductive and connected to wires (not shown) in support structure 110. In one example, flexing members 105A and 105B and tip 120 comprise highly-doped silicon and have a low electrical resistance, and heater 125 is formed of lightly doped silicon having a high electrical resistance sufficient to heat tip 120, in one example, between about 100° C. and about 400° C. when current is passed through heater 125. The electrical resistance of heater 125 is a function of temperature.

Also illustrated in FIG. 1A is a storage medium (or a recording medium) 130 comprising a substrate 130A, and a cured polyimide resin layer 130B. In one example, substrate 130A comprises silicon. Cured polyimide resin layer 130B may be formed by solution coating, spin coating, dip coating or meniscus coating uncured polyimide resin formulations and performing a curing operation on the resultant coating. In one example, cured polyimide resin layer 130B has a thickness between about 10 nm and about 500 nm and a surface roughness of less than about 1.0 nm evaluated in a 1 micron by 1 micron field and a variation in thickness of less than about 10% across the cured polyimide resin layer. Cured polyimide resin layer 130B includes thermally reversible hydrogen bonding cross-linking moieties as well as thermally irreversible (to at least 400° C.) covalent bonding cross-linking moieties. The composition of the uncured polyimide resin and cured polyimide resin layer 130B is described in detail infra. An optional penetration stop layer 130C is shown between cured polyimide resin layer 130B and substrate 130A. Penetration stop layer 130C limits the depth of penetration of tip 120 into cured polyimide resin layer 130B.

Turning to the operation of tip assembly 100, in FIG. 1A, an indentation 135 is formed in cured polyimide resin layer 130B by heating tip 120 to a writing temperature $T_W$ by passing a current through cantilever 105 and pressing tip 120 into cured polyimide resin layer 130B. Heating tip 120 and applying a load force, e.g. by electrostatic means as described in Patent Application EP 05405018.2, 13 Jan. 2005, allows the tip to penetrate the cured polyimide resin layer 130B forming indentation 135, which remains after the tip is removed. In one example, the cured polyimide resin layer 130B is heated to about 150° C. or higher (depending upon the composition of cured polyimide layer 130B) by heated tip 120, and a load force of less than 500 nN is applied (the exact value depending upon the composition of cured polyimide layer 130B, the temperature of the heated tip and the desired indentation size) to form indentation 135. As indentations 135 are formed, a ring 135A of cured polyimide oligomer is formed around the indentation. Indentation 135 represents a data bit value of "1", a data bit value of "0" being represented by an absence of an indentation.

FIGS. 1B and 1C illustrate reading the bit value. In FIGS. 1B and 1C, tip assembly 100 is scanned across a portion of cured polyimide resin layer 130B. When tip 120 is over a region of cured polyimide resin layer 130B not containing an indentation, heater 125 is a distance D1 from the surface of the cured polyimide resin layer (see FIG. 1B). When tip 120 is over a region of cured polyimide resin layer 130B containing an indentation, heater 125 is a distance D2 from the surface of the cured polyimide resin layer (see FIG. 1C) because the tip "falls" into the indentation. D1 is greater than D2. If heater 125 is at a temperature $T_R$ (read temperature), which is lower than $T_W$ (write temperature), there is more heat loss to substrate 130A when tip 120 is in an indentation than when the tip is not. This can be measured as a change in resistance of the heater, thus "reading" the data bit value. It is advantageous to use a separate heater for reading, which is mechanically coupled to the tip but thermally isolated from the tip. A typical embodiment is disclosed in Patent Application EP 05405018.2, 13 Jan. 2005.

"Erasing" (not shown) is accomplished by positioning tip 120 in close proximity to indentation 135, heating the tip to a temperature $T_E$ (erase temperature), and applying a loading force $F_E$, which causes the previously written indent to relax to a flat state whereas a new indent is written slightly displaced with respect to the erased indent. The cycle is repeated as needed for erasing a stream of bits whereby an indent always remains at the end of the erase track. The erase temperature $T_E$ and the erase force $F_E$ may be chosen differently from the write temperature $T_W$ and the write force $F_W$. Typically, $T_E$ is greater than $T_W$, and/or $F_E$ is smaller than $F_W$. The erase pitch is typically on the order of the rim radius. In one example, the cured polyimide resin layer 130B is heated to about 150° C. or higher by heated tip 120, and the erase pitch is 10 nm to eliminate indentation 135.

Figure 2:
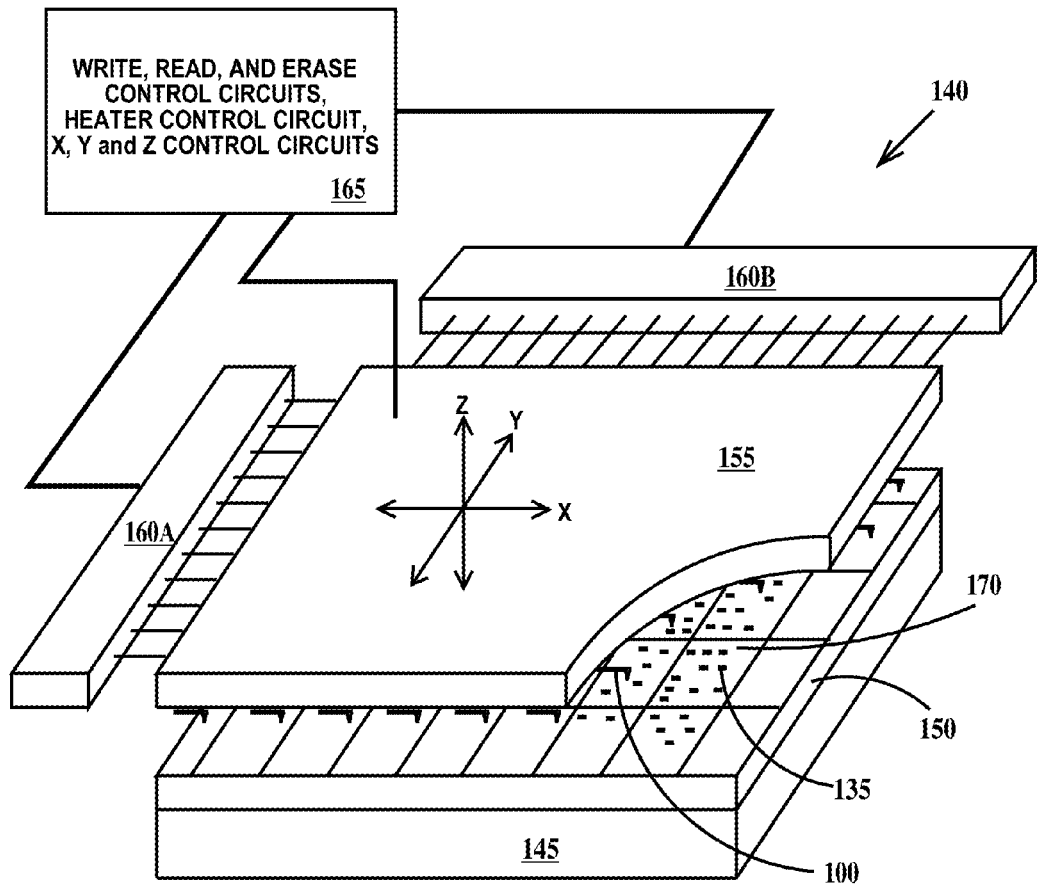
FIG. 2 is an isometric view of a local probe storage array including the data storage medium according to the embodiments of the present invention.

FIG. 2 is an isometric view of a local probe storage array 140 including the data storage medium according to the embodiments of the present invention. In FIG. 2, local probe storage array 140 includes substrate 145 having a cured polyimide resin layer 150 the same as cured polyimide resin layer 130B of FIGS. 1A, 1B and 1C, which acts as the data-recording layer. An optional tip penetration stop layer may be formed between cured polyimide resin layer 150 and substrate 145. In one example, substrate 145 comprises silicon. Cured polyimide resin layer 150 may be formed by solution coating, spin coating, dip coating or meniscus coating uncured polyimide resin formulations and performing a curing operation on the resultant coating. In one example, cured polyimide resin layer 150 has a thickness between about 10 nm and about 500 nm and a variation in thickness across a writeable region of cured polyimide resin layer 150 of less than about 1.0 nm across the cured polyimide resin layer. The composition of cured polyimide resin layer 150 is the same as cured polyimide resin layer 130B of FIG. 1C. Positioned over cured polyimide resin layer 150 is a probe assembly 155 including an array of probe tip assemblies 100 (described supra). Probe assembly 155 may be moved in the X, Y and Z directions relative to substrate 145 and cured polyimide resin layer 150 by any number of devices as is known in the art. Switching arrays 160A and 160B are connected to respective rows (X-direction) and columns (Y-direction) of probe tip assemblies 100 in order to allow addressing of individual probe tip assemblies. Switching arrays 160A and 160B are connected to a controller 165 which includes a write control circuit for independently writing data bits with each probe tip assembly 100, a read control circuit for independently reading data bits with each probe tip assembly 100, an erase control circuit for independently erasing data bits with each probe tip assembly 100, a heat control circuit for independently controlling each heater of each of the probe tip assembles 100, and X, Y and Z control circuits for controlling the X, Y and Z movement of probe assembly 155. The Z control circuit controls a contact mechanism (not shown) for contacting the cured polyimide resin layer 150 with the tips of the array of probe tip assemblies 100.

During a write operation, probe assembly 155 is brought into proximity to cured polyimide resin layer 150 and probe tip assemblies 100 are scanned relative to the cured polyimide resin layer. Local indentations 135 are formed as described supra. Each of the probe tip assemblies 100 writes only in a corresponding region 170 of cured polyimide resin layer 150. This reduces the amount of travel and thus time required for writing data.

During a read operation, probe assembly 155 is brought into proximity to cured polyimide resin layer 150 and probe tip assemblies 100 are scanned relative to the cured polyimide resin layer. Local indentations 135 are detected as described supra. Each of the probe tip assemblies 100 reads only in a corresponding region 170 of cured polyimide resin layer 150. This reduces the amount of travel and thus the time required for reading data.

During an erase operation, probe assembly 155 is brought into proximity to cured polyimide resin layer 150, and probe tip assemblies 100 are scanned relative to the cured polyimide resin layer. Local indentations 135 are erased as described supra. Each of the probe tip assemblies 100 reads only in a corresponding region 170 of cured polyimide resin layer 150. This reduces the amount of travel and thus time required for erasing data.

Additional details relating to data storage devices described supra may be found in the articles "*The Millipede—More than one thousand tips for future AFM data storage*," P. Vettiger et al., *IBM Journal of Research and Development*. Vol. 44 No. 3, May 2000 and "*The Millipede—Nanotechnology Entering Data Storage*," P. Vettiger et al., *IEEE Transaction on Nanotechnology*, Vol. 1, No, 1, March 2002. See also United States Patent Publication 2005/0047307, Published Mar. 3, 2005 to Frommer et al. and United States Patent Publication 2005/0050258, Published Mar. 3, 2005 to Frommer et al., both of which are hereby included by reference in there entireties.

Turning to the composition of cured polyimide resin layer 130B of FIGS. 1A through 1C and cured polyimide resin layer 150 of FIG. 2, there are multiple uncured resin formulations of polyimide oligomers (dianhydride/diamine condensation oligomers) and cross-linking agents that, when reacted (cured) together, cross-link to formed cured polyimide resin layers. It should be understood that for the purposes of the present invention curing an oligomer implies cross-linking the oligomer to form a resin. Oligomers themselves are short chain oligomers. The polyimide oligomers of the embodiments of the present invention advantageously have molecular weights between about 4000 Daltons and about 12000 Daltons.

The polyimide medium or imaging layer of the embodiments of the present invention advantageously meets certain criteria. These criteria include high thermal stability to withstand millions of write and erase events, low wear properties (low pickup of material by tips), low abrasion (tips do not easily wear out), low viscosity for writing, glassy character with little or no secondary relaxations for long data bit lifetime, and shape memory for erasability.

Thermal and oxidative stability was imparted to cured polyimide resins by incorporating a large aromatic content in the polyimide oligomers and by ladder type linkages such as imide moieties. The polyimide oligomers incorporate irreversible covalent bonding cross-linking moieties in the backbone of the polyimide oligomer (backbone covalent bonding linkers) or irreversible covalent bonding cross-linking moieties at the terminal ends of the polyimide oligomer (terminal covalent bonding linkers), or both backbone and terminal covalent bonding linkers. Cured polyimide resins according to embodiments of the present invention have high temperature stability while maintaining a low glass transition temperature ($T_g$), which is contrary to current teaching that high temperature stability results in a high $T_g$ and vice versa. In one example, cured polyimide resins according to embodiments of the present invention are thermally and oxidatively stable to at least 400° C.

Wear and erasability (and writeability) of the media were improved by incorporation of thermally reversible hydrogen bonding cross-linking moieties into the backbone of the polyimide oligomer (backbone hydrogen bonding linkers) or incorporation of thermally reversible hydrogen bonding cross-linking moieties at the terminal ends of the polyimide oligomer (terminal hydrogen binding linkers) or by incorporation of both backbone and terminal hydrogen bonding linkers into the polyimide oligomer. Because the cross-linking bonds between polyimide oligomers formed by the hydrogen bonding linkers are thermally reversible, less energy is required to thermally deform the polyimide resin as breaking the hydrogen bonds effectively and momentarily lowers the $T_g$ of the polyimide resin which then returns to its higher value when the heat source is removed and the hydrogen bonds reestablish themselves.

Further control over the cross-link density was achieved by adding controlled amounts of reactant diluents described infra that enhance covalent cross-linking. These reactive diluents form a high density of cross-links that enhance the wear properties of the polyimide medium without greatly increasing the $T_g$ or breadth of the glass transition.

The glass transition temperature was adjusted for good write performance. To optimize the efficiency of the write process there should be a sharp transition from the glassy state to the rubbery state. A sharp transition allows the cured resin to flow easily when a hot tip is brought into contact and quickly return to the glassy state once the hot tip is removed. However, too high a $T_g$ leads to high write power and damage to the probe tip assemblies. Examples of cured polyimide resins of the embodiments of the present invention have $T_g$s between about 150° C. and about 280° C.

Good flow and low viscosities necessary for writing were obtained by the incorporation of hetero-atoms such as oxygen and sulfur in the polyimide resin backbone and varying the catenation of aromatic rings from para to meta linkages. General formulations of uncured polyimide resins according to embodiments of the present invention are illustrated in Table I. An "X" under one of uncured formulations A, B1, B2, C, D1, D2, E, F1, F2, G1, G2, H1, H2, I1 and I2 indicates the polyimide oligomer includes the moiety and functionality indicated. (See Note 1 for an important proviso.) It should be noted that the primary monomer diamine does not have hydrogen-bonding capability, but can be replaced in some formulations (i.e. B2, D2, F2, G2, H2 and I2) with a diamine that does have hydrogen-bonding capability.

TABLE I

| MOIETIES | FORMULATION | | | | | | | | | | | | | | |
|---|---|---|---|---|---|---|---|---|---|---|---|---|---|---|---|
| | A | B1 | B2 | C | D1 | D2 | E | F1 | F2 | G1 | G2 | H1 | H2 | I1 | I2 |
| Primary Monomer (Dianhydride) | X | X | X | X | X | X | X | X | X | X | X | X | X | X | X |
| Primary Monomer (Diamine) No H-Bonding | X | X | | X | X | | X | X | | X | | X | | X | |
| Terminal End Covalent Bonding Cross Linker | $X^1$ | X | X | | | | X | X | X | $X^1$ | $X^1$ | $X^1$ | $X^1$ | | |
| Backbone Covalent Bonding Cross Linker | | | | X | X | X | X | X | X | X | X | | | X | X |

TABLE I-continued

| MOIETIES | A | B1 | B2 | C | D1 | D2 | E | F1 | F2 | G1 | G2 | H1 | H2 | I1 | I2 |
|---|---|---|---|---|---|---|---|---|---|---|---|---|---|---|---|
| Terminal End Hydrogen Bonding Cross Linker | X[1] | | | X | | | X | | | X[1] | X[1] | X[1] | X[1] | X | X |
| Backbone Hydrogen Bonding Cross Linker | | X | X | | X | X | | X | X | X | X | X | X | X | X |

Notes
[1] The same polyimide oligomer cannot have both a terminal end covalent bonding cross linker and a terminal end hydrogen bonding cross linker.
Note
[2] all polyimide oligomers according the various embodiments of the present invention advantageously have a molecular weight of from about 5,000 Daltons to about 15,000 Daltons.

It is a feature of the embodiments of the present invention that the polyimide oligomers include both a covalent bonding cross-linking moiety and a hydrogen bonding cross-linking moiety. Inclusion of a reactive diluent in the uncured formulation is optional for all uncured formulations. All uncured formulations advantageously include a casting solvent to allow solution coating, spin coating, dip coating or meniscus coating of the uncured formulations to form a layer of uncured resin on a substrate. The solvent is then driven off during thermal curing. In one example, curing is performed at about 350° C. to about 400° C. Examples of casting solvents include, but are not limited to, polar organic solvents such as tetrahydrofuran (THF), dichloromethane ($CH_2Cl_2$), N-methylpyrrolidone (NMP), and cyclohexanone and mixtures of THF and acids such as hydrochloric acid, acetic acid and trifluoroacetic acid. The acids act as solubilizing agents, breaking the cross-linking hydrogen bonds between oligomer chains.

A general example of uncured formulation B1/B2 (incorporating backbone hydrogen bonding moieties) comprises polyimide oligomers having the structure:

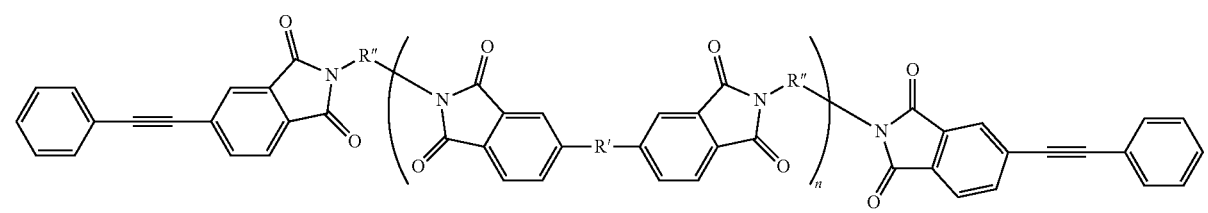

(I)

wherein R' is selected from a first group consisting of

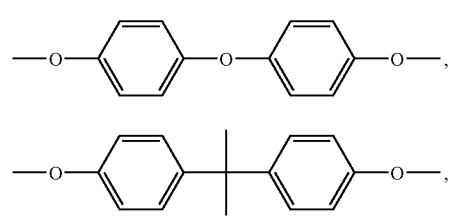

(II)

(III)

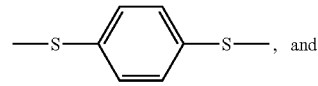, and (IV)

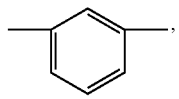

(V)

wherein each R" group is independently selected from a second group, a third group or from both the second and third groups, the second group consisting of

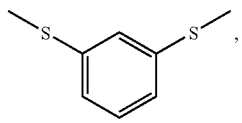

(VI)

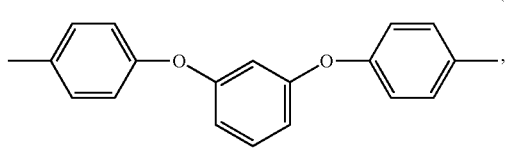

(VII)

(VIII)

-continued

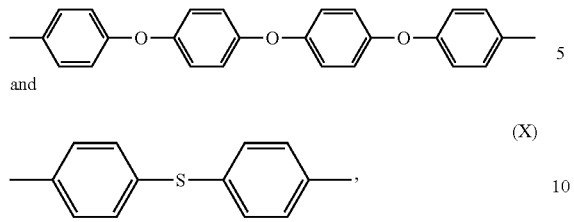

and said third group consisting of

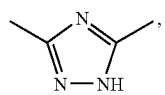

imidazolyl, pyrazolyl, pyrazinyl, pyrimidinyl, pyridazinyl indazoyl, purinyl, phthalazinyl, naphthyridinyl, quinoxalinyl, quinazolinyl, 1,2,3-triazolyl, 1,2,4-triazolyl thiazolyl, isothiazolyl 1,3,5-triazinyl, 1,2,4-triazinyl, 1,2,3-triazinyl, pyrido[3,4-b]-pyridinyl, pyrido[3,2-b]-pyridinyl, pyrido[4,3-b]pyridinyl, purinyl, cinnolinyl, pteridinyl, beta-carbolinyl, phenazinyl, 1,7-phenanthrolinyl, 1,10-phenanthrolinyl, 4,7-phenanthrolinyl, phenarsazinyl, isothiazolyl, thienyl, and thianthrenyl imide, and wherein n is an integer from about 5 to about 50.

Structure (XI) is triazole.

The endgroup, having the structure:

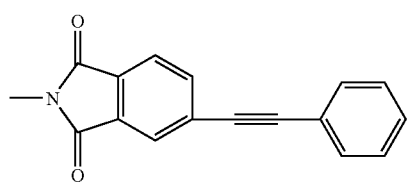

provides terminal covalent cross-linking of the polyimide oligomers. In structure (I) there are (n+1) R″ groups. In a first example, some of the (n+1) R″ groups are selected from the second group and some of the (n+1) R″ groups are selected from the third group. In a second example, all the (n+1) R″ groups are selected from the third group. The ratio of the number of R″ groups incorporated into the backbone of a B1/B2 type oligomer from the second group to the number of R″ groups incorporated from the third group may be controlled by adjustment of the relative amounts of primary monomer diamine (with no hydrogen bonding capability) and backbone hydrogen bonding cross linker reagents used in the polyimide oligomer preparation reaction, examples of which are provided infra.

A general example of uncured formulation F1/F2 (incorporating backbone hydrogen bonding moieties and backbone covalent bonding moieties) comprises linear polyimide oligomers having the structure:

$$E_1-(A_1-A_2-A_3-\ldots-A_N)-E_2 \qquad (XIII\text{-}A)$$

wherein $E_1$ is structured as

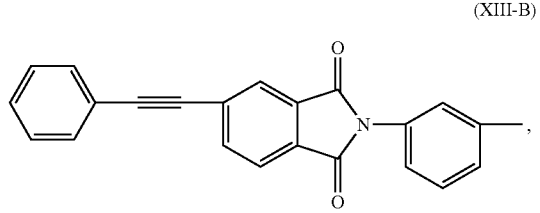 [SMILES: Cc1cccc(N2C(=O)c3ccc(C#Cc4ccccc4)cc3C2=O)c1 ; ","]

wherein each of $A_1, A_2, A_3 \ldots A_N$ is independently either

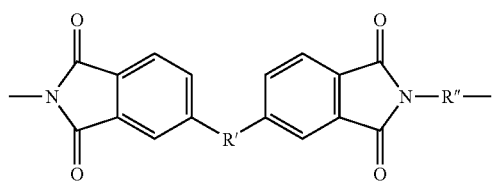

or

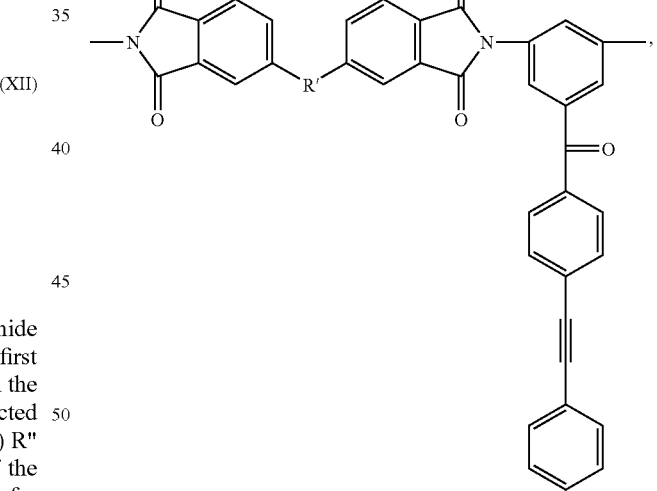

wherein $E_1$ is structured as

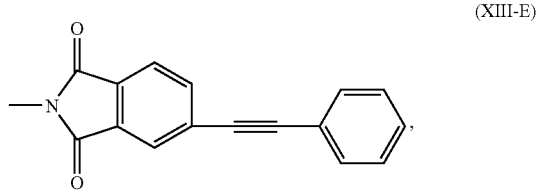

wherein N is an integer from about 10 to about 45 and wherein from about 8 to about 35 of $A_1, A_2, A_3 \ldots A_N$ are

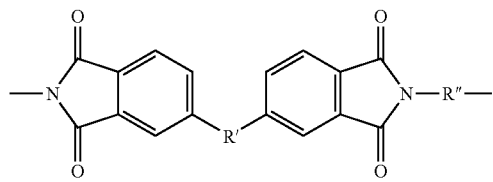
(XVIII-C)

and from about 2 to about 10 of $A_1, A_2, A_3 \ldots A_N$ are

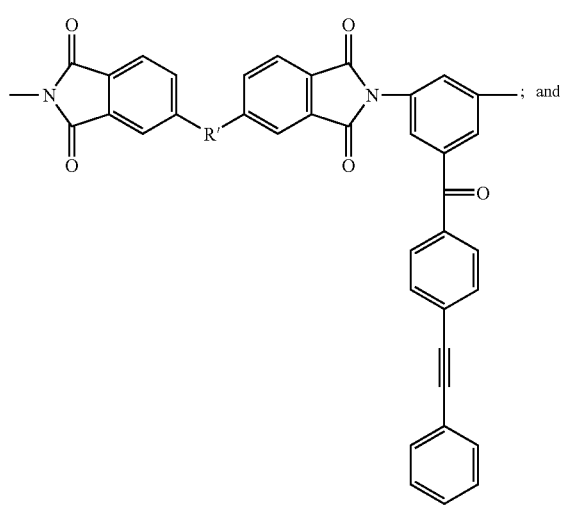
(XIII-D)

wherein R' is selected from the first group consisting of

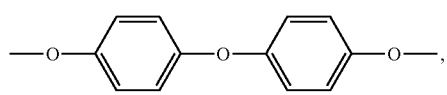
(II)

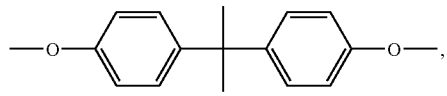
(III)

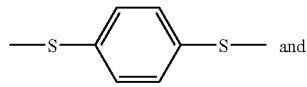
(IV)

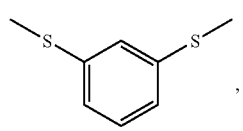
(V)

wherein each R" group is independently selected from a second group, a third group or from both the second and third groups, the second group consisting of

(VI)

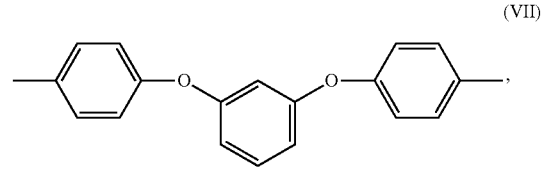
(VII)

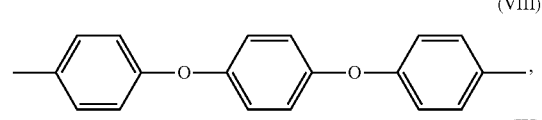
(VIII)

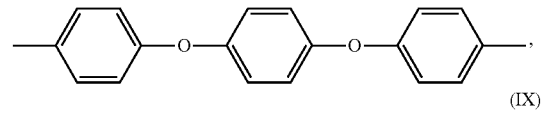
(IX)

and

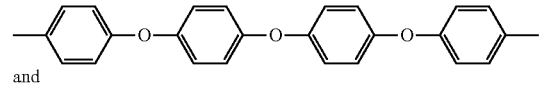
(X)

the third group consisting of

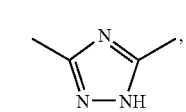
(XI)

imidazolyl, pyrazolyl, pyrazinyl, pyrimidinyl, pyridazinyl indazoyl, purinyl, phthalazinyl, naphthyridinyl, quinoxalinyl, quinazolinyl, 1,2,3-triazolyl, 1,2,4-triazolyl thiazolyl, isothiazolyl 1,3,5-triazinyl, 1,2,4-triazinyl, 1,2,3-triazinyl, pyrido[3,4-b]-pyridinyl, pyrido[3,2-b]-pyridinyl, pyrido[4,3-b]pyridinyl, purinyl, cinnolinyl, pteridinyl, beta-carbolinyl, phenazinyl, 1,7-phenanthrolinyl, 1,10-phenanthrolinyl, 4,7-phenanthrolinyl, phenarsazinyl, isothiazolyl, thienyl, and thianthrenyl imide, and wherein at least one R" group is selected from the third group.

Structure (XI) is triazole. In one example structure (XIII-A) has a molecular weight of from about 5,000 Daltons to about 15,000 Daltons, with a molecular weight of about 7,000 Daltons to about 9000 Daltons preferred.

The endgroup, having the structure:

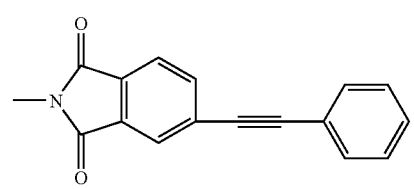
(XII)

provides terminal covalent cross-linking of the polyimide oligomers.

The backbone group, having the structure:

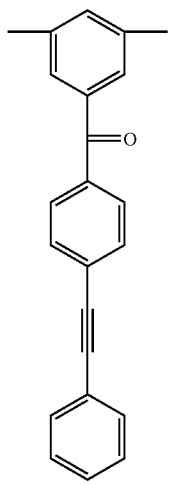
(XIV)

provides backbone covalent cross-linking of the polyimide oligomers.

In a first example, some R" groups included in structure (XIII-A) are selected from the second group and some R" groups are selected from the third group. In a second example, all R" groups included in structure (XIII-A) are selected from the third group. The ratio of the number of R" groups incorporated into the backbone of a F1/F2 type oligomer from the second group to the number of R" groups incorporated from the third group may be controlled by adjustment of the relative amounts of primary monomer diamine (with no hydrogen bonding capability) and backbone hydrogen bonding cross linker reagents used in the polyimide oligomer preparation reaction, examples of which are provided infra.

A general example of uncured formulation C (incorporating terminal hydrogen bonding moieties) comprises polyimide oligomers having the structure:

(IV)

(V)

wherein each R" group is selected from the group consisting of (VI)

(VII)

(VIII)

(IX)

and (X)

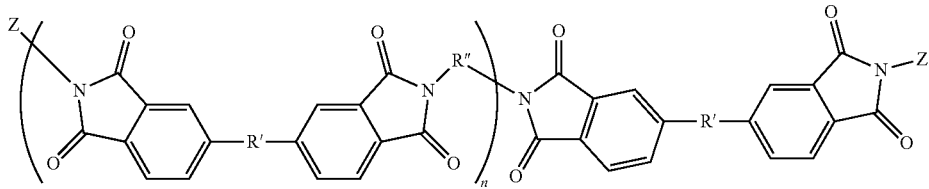
(XV)

wherein R' is selected from the group consisting of (II)

(III)

wherein said Z is selected from the group consisting of

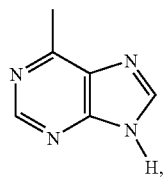
(XX)

(XXI)

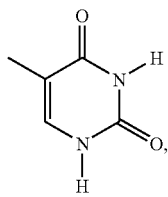

(XXII)

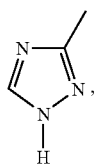

3,5-diamino-1,2,4-triazole, 2,6-diaminopurine, and 2,6-diamino-8-purinol, 2,3-diaminopyridine; and wherein n is an integer from about 5 to about 50.

Z may also be selected from unsaturated heterocyclic diamine moities produced by reduction of 2-amino-6-nitrobenzothiazole, 2-amino-5-(4-nitrophenylsulfonyl)thiazole, 2-amino-5-nitropyrimidine, 2-amino-5-nitrothiazole, or 3-amino-4-pyrazole carbonitrile.

Z may also be selected from moieties produced by from ammonia Amination of 2-amino-5-bromopyrimidine, 2-amino-5-bromothiazole, 2-amino-4-chlorobenzothiazole, 2-amino-6-chlorobenzothiazole, 2-amino-4-(4-chlorophenyl)thiazole, 2-amino-6-chloropurine, or 2-amino-6-fluorobenzothiazole.

Examples of reactive diluents include structure (XXIII):

(XXIII)

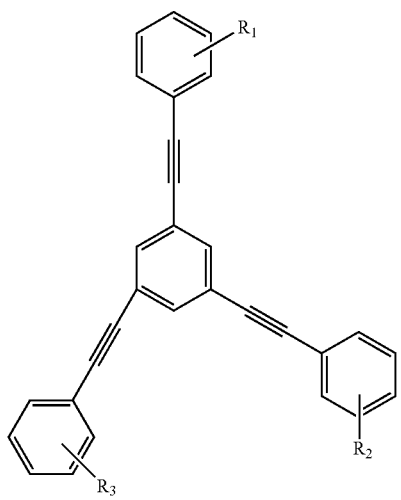

where $R_1$, $R_2$ and $R_3$ are each independently selected from the group consisting of hydrogen, alkyl groups, aryl groups, cycloalkyl groups, alkoxy groups, aryloxy groups, alkylamino groups, arylamino groups, alkylarylamino groups, arylthio, alkylthio groups and (XXIV)

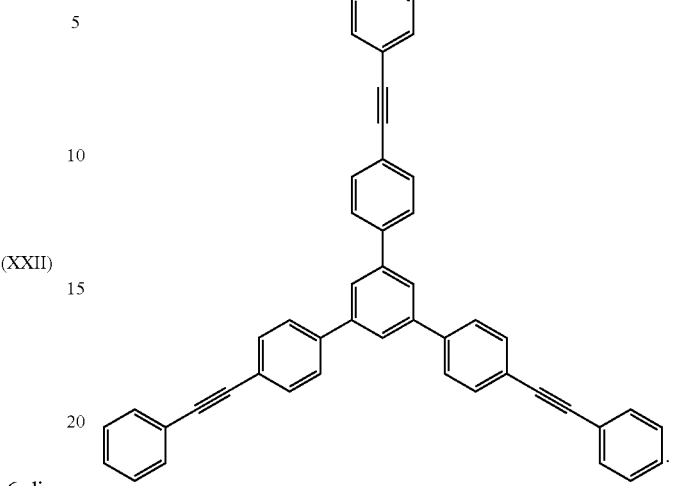

It should be noted that reactive diluents (XXIII) and (XXIV) contain three substituted phenylethynyl groups. The phenylethynyl groups of the polyimide oligomers and the phenylethynyl group's reactive diluents provide the cross-linking of the polyimide oligomers into a polyimide resin.

An exemplary hydrogen-bonding cross-linking of polyimide oligomers according to embodiments of the present invention is illustrated in structure (XXV). The thermally reversible hydrogen bonds (indicated by the dashed lines) are capable of evanescence and reversion. Generally speaking evanescence and reversion of a thermally reversible bond is an equilibrium process. Above a threshold temperature, evanescence of the bond is favored. Below the threshold temperature, reversion of the bond is favored. Hydrogen bonding may also be described as a donation and withdrawal of electrons to a thermally reversible bond.

(XXV)

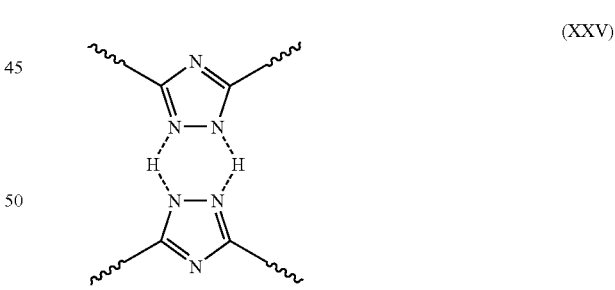

By contrast, covalent bonds are not capable of evanescence and reversion as described supra, but remain relatively stable over a range of temperatures, until such temperatures at which the bond irreversibly/permanently degrades

EXPERIMENTAL

In the following preparation examples, Table II lists the polyimide oligomer reagents used and the moiety/functionality provided by each reagent as well as the shorthand notation used.

TABLE II

| Chemical Name | Notation | Moiety/Functionality |
| --- | --- | --- |
| 1,3,bis(4'-aminophenoxy)benzene | APB | Diamine (backbone) Non H-Bonding |
| 4,4'(4,4'-isopropyidene-diphenoxy)bisphthalic anhydride | BisADA | Dianhydride (backbone |
| 3,5-diamino-4'-phenylethynyl benzophenone | DABPP | Backbone covalent bonding linker |
| 4-phenylethynylpthalic anhydride | DABPPE | Terminal covalent bonding linker |
| 3,5-diamino-1,2,4-triazole | DAT | Backbone hydrogen-bonding linker |
| 3-amino-1,2,4-triazole | AT | Terminal hydrogen bonding linker |

All materials were purchased from Aldrich and used without further purification. The monomers 1,3-bis(4'-aminophenoxy)benzene and 4,4'(4,4'-isopropyldene-diphenoxy)bisphthalic anhydride) were purchased from ChrisKev. The dianhydride was recrystallized from toluene and acetic anhydride.

In general polyimide synthesis comprised dissolving the monomers, a diamine and a dianhydride (and other reagents from which the cross-linking moieties are derived) in dry NMP under a dry atmosphere. The reactants were stirred for between 14 and 20 hours after which 3 mole equivalents of triethylamine and acetic anhydride were added to effect imidization. The reaction was then allowed to stir for about 48 hours at room temperature followed by two hours at 60° C. The oligomer was precipitated by pouring the reaction mixture into stirring methanol. The oligomer was collected by vacuum filtration and was washed on the frit with water, saturated sodium bicarbonate solution, and methanol. Finally the oligomer was precipitated twice from NMP and dried overnight in a 60° C. vacuum oven.

Example 1a

Terminal Covalent Cross-Linking with Backbone Hydrogen-Bonding Cross-Linking (Example of Formulation B1 of Table I)

To a round bottom flask equipped with a stirrer 1.047 grams (0.00358 mol) of APB, 0.152 gram (0.153 mol) of DAT, 2.181 grams (0.0042 mol) of bis ADA and 0.457 gram (0.00184 mol) of DABPPE were charged and rinsed down with 40 ml of NMP and allowed to stir overnight (between 14 and 20 hours) to generate the poly(amic-acid). Triethylamine (1.52 grams) and acetic anhydride (1.0 gram) were added to effect imidization and the reaction was then allowed to stir for 48 hours at room temperature followed by two hours at 60° C. The oligomer was precipitated by pouring the reaction mixture into stirring methanol. The oligomer was collected by vacuum filtration and was washed on the frit with water, saturated sodium bicarbonate solution, and methanol. Finally the oligomer was precipitated twice from NMP and dried overnight in a 60° C. vacuum oven.

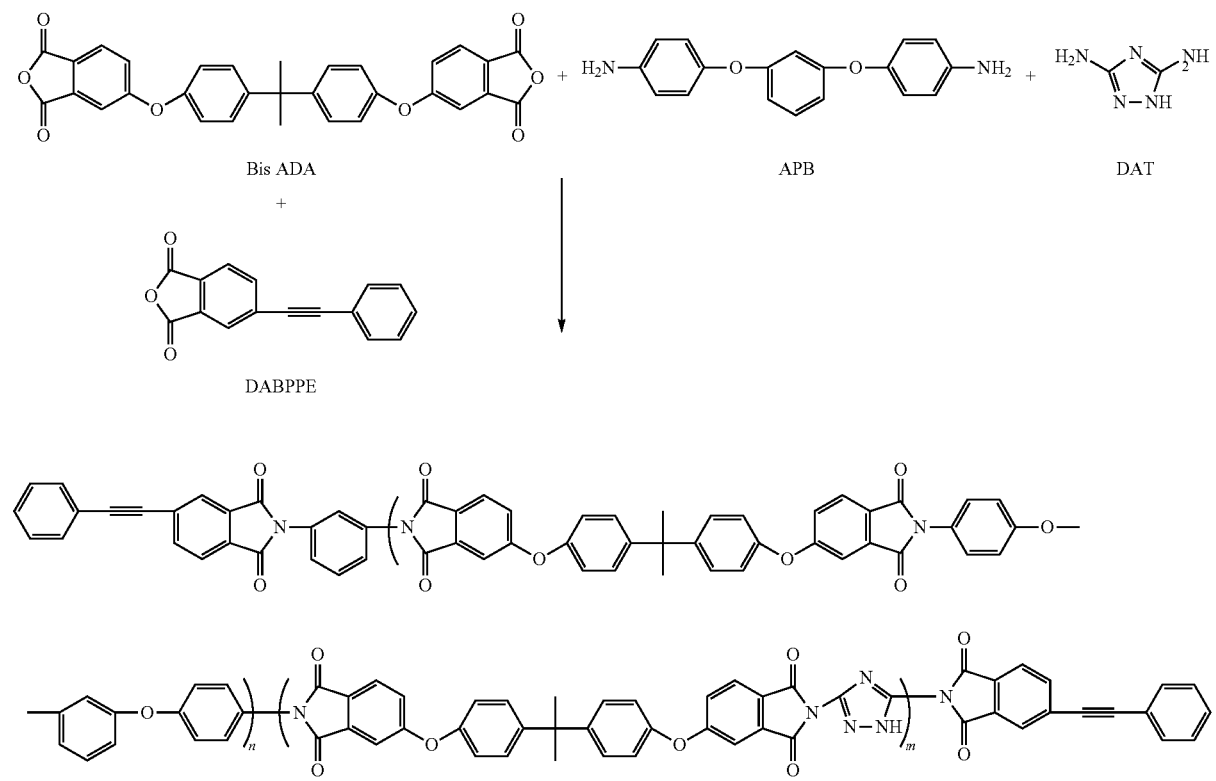

The polyimide oligomer of example 1a should not be thought of as requiring the monomers within the ( )n being in a linear subsequence followed by all monomers within the ( )m being in a second linear subsequence; they are shown that way to indicate there n and m numbers of the two monomers. Rather, the two monomers may be arranged in a linear sequence with (a) all n type monomers in one subsequence and all m type monomers in another subsequence, (b) in an alternating sequence, (c) in other regular repeating sequences or (d) in random sequence.

Example 1b

Terminal Covalent Cross-Linking with Backbone Hydrogen-Bonding Cross-Linking (Example of Formulation B2 of Table I where the Primary Monomer Diamine and the Backbone Hydrogen-Bonding Cross-Linker are the same Reagent)

To a round bottom flask equipped with a stirrer 0.506 grams (0.55 mol) of DAT, 2.181 grams (0.0042 mol) of bis ADA and 0.457 gram (0.00184 mol) of DABPPE were charged and rinsed down with 40 ml of NMP and allowed to stir overnight (between 14 and 20 hours) to generate the poly(amic-acid). Triethylamine (1.52 grams) and acetic anhydride (1.0 gram) were added to effect imidization and the reaction was then allowed to stir for 48 hours at room temperature followed by 2 hours at 60° C. The oligomer was precipitated by pouring the reaction mixture into stirring methanol. The oligomer was collected by vacuum filtration and was washed on the frit with water, saturated sodium bicarbonate solution, and methanol. Finally the oligomer was precipitated twice from NMP and dried overnight in a 60° C. vacuum oven.

Example 2

Terminal Hydrogen-Bonding Cross-Linking with Backbone Covalent Cross-Linking (Example of Formulation C of Table I)

To a round bottom flask equipped with a stirrer 1.087 gram (0.0037 mol) of APB, 2.659 grams (0.0051 mol) of bis ADA and 0.290 gram (0.00093 mol) of DABPPE and 0.77 gram (0.00092 mol) of AT were charged and rinsed down with 40 ml of NMP and allowed to stir overnight (between 14 and 20 hours) to generate the poly(amic-acid). Triethylamine (1.52 grams) and acetic anhydride (1.0 gram) were added to effect imidization and the reaction was then allowed to stir for 48 hours at room temperature followed by 2 hours at 60° C. The oligomer was precipitated by pouring the reaction mixture into stirring methanol. The oligomer was collected by vacuum filtration and was washed on the frit with water, saturated sodium bicarbonate solution, and methanol. Finally the oligomer was precipitated twice from NMP and dried overnight in a 60° C. vacuum oven.

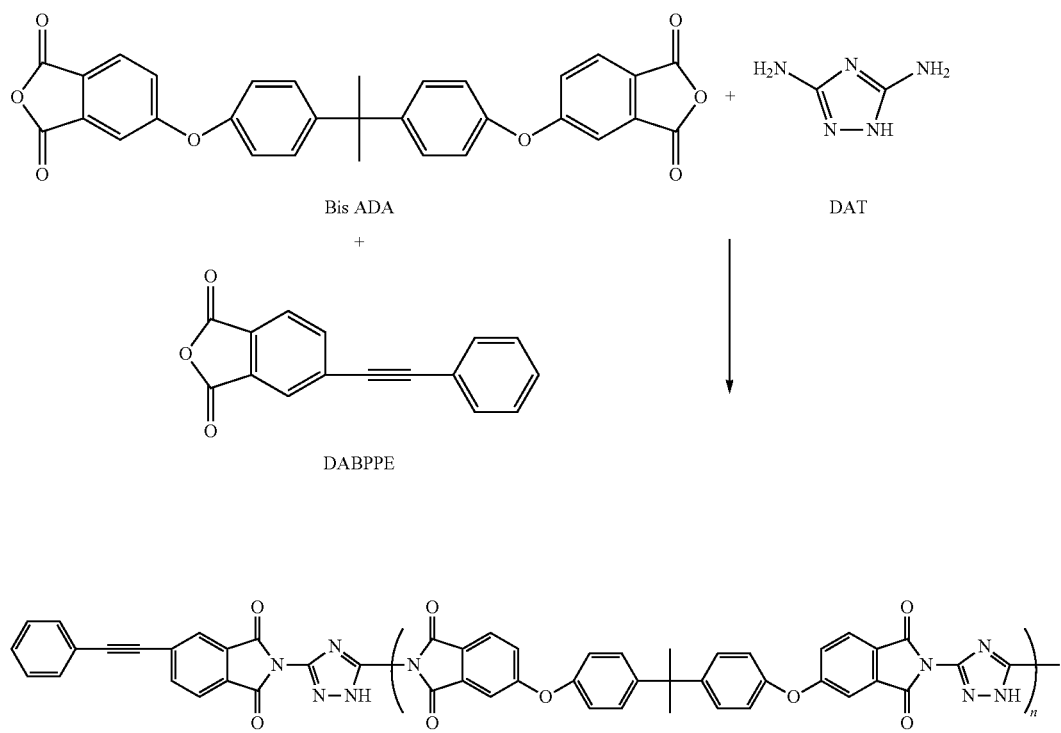

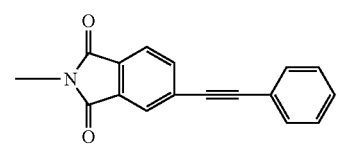

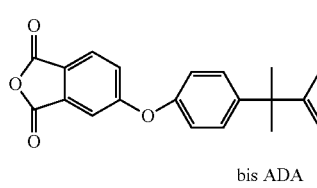

bis ADA

APB

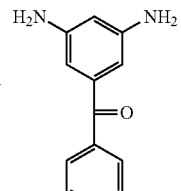

DABPP

AT

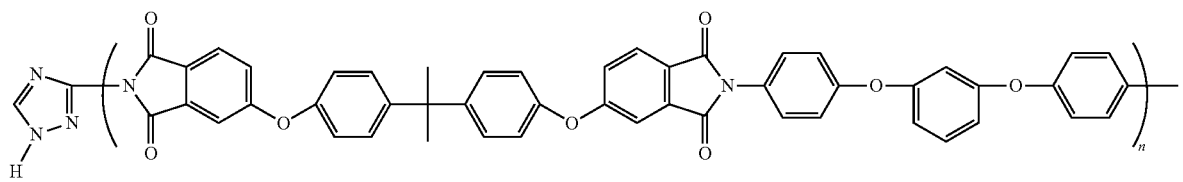

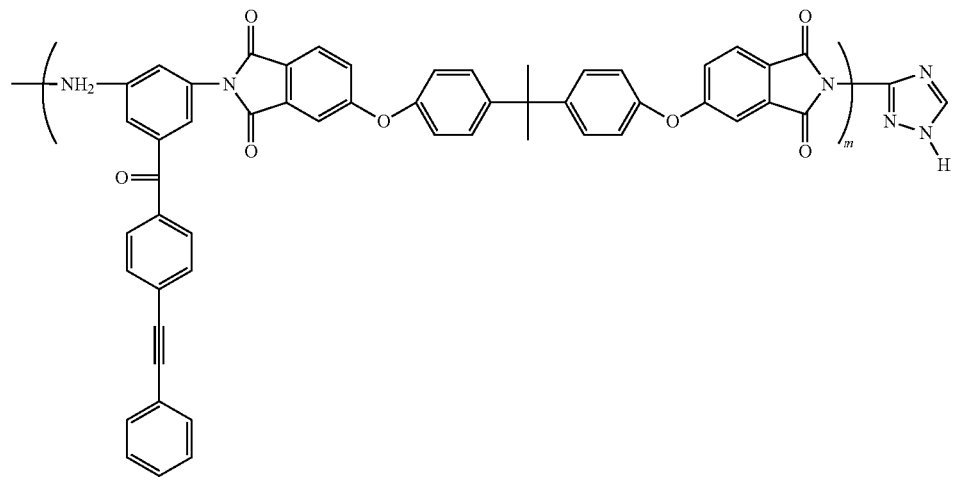

The polyimide oligomer of example 2 should not be thought requiring the monomers within the ( )n being in a linear subsequence followed by all monomers within the ( )m being in a second linear subsequence; they are shown that way to indicate there a n and m numbers of the two monomers. Rather, the two monomers may be arranged in a linear sequence with (a) all n type monomers in one subsequence and all m type monomers in another subsequence, (b) in an alternating sequence, (c) in other regular repeating sequences or (d) in random sequence.

Example 3

Terminal Covalent Cross-Linking with Backbone Hydrogen-Bonding Cross-Linking (Example of Formulation I1 of Table I)

To a round bottom flask equipped with a stirrer 0.3687 gram (0.0037 mol) of DAT, 2.659 grams (0.00093 mol) of bis ADA and 0.290 gram (0.00093 mol) of DABPPE and 0.077 gram (0.00092 mol) of AT were charged and rinsed down with 40 ml of NMP and allowed to stir overnight (between 14 and 20 hours) to generate the poly(amic-acid). Triethylamine (1.52 grams) and acetic anhydride (1.0 gram) were added to effect imidization and the reaction was then allowed to stir for 48 hours at room temperature followed by 2 hours at 60° C. The oligomer was precipitated by pouring the reaction mixture into stirring methanol. The oligomer was collected by vacuum filtration and was washed on the frit with water, saturated sodium bicarbonate solution, and methanol. Finally the oligomer was precipitated twice from NMP and dried overnight in a 60° C. vacuum oven.

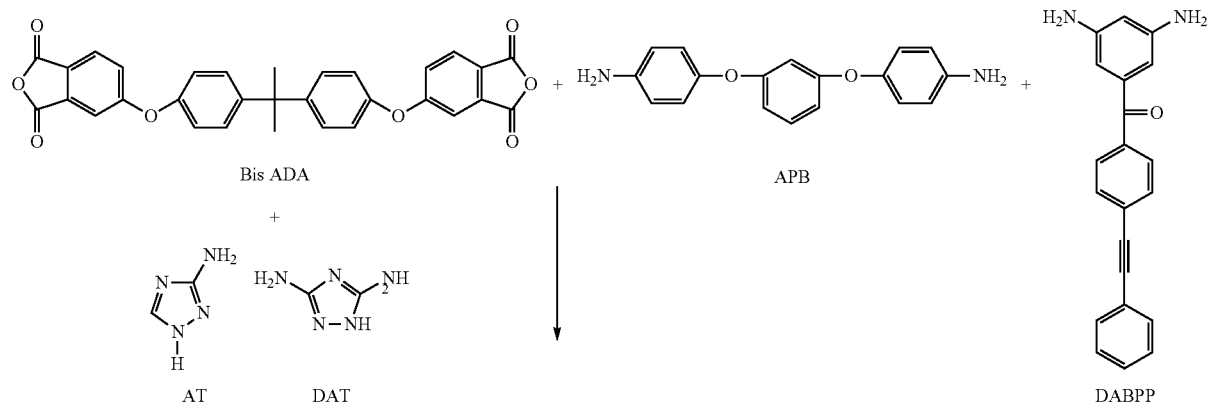

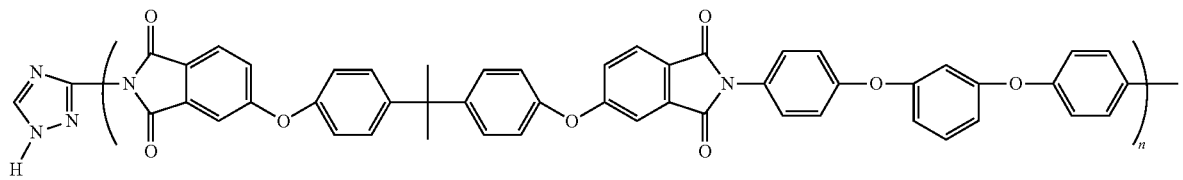

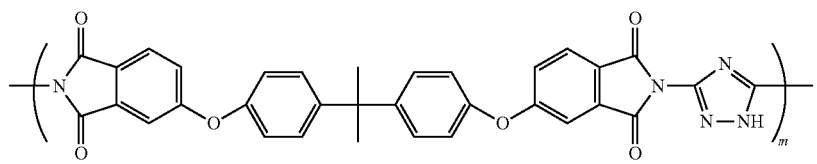

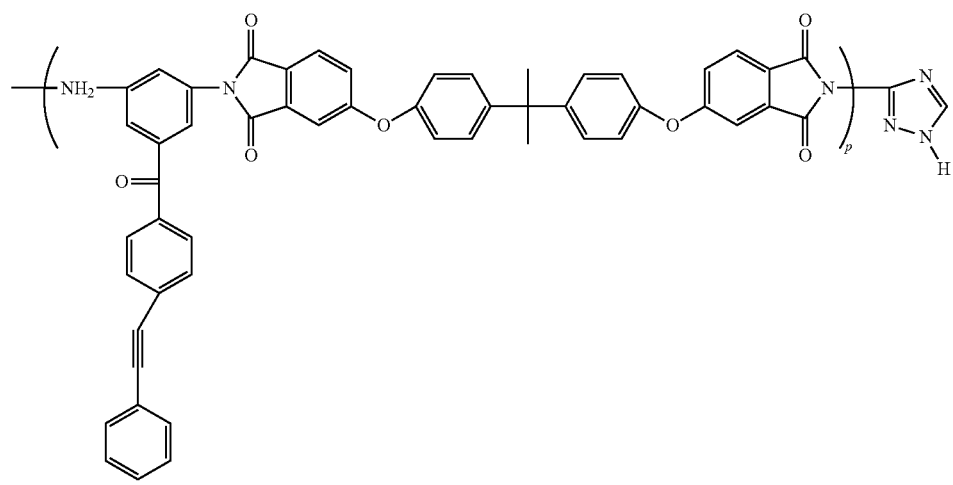

The polyimide oligomer of example 3 should not be thought of as requiring the monomers within the ( )n being in a linear subsequence followed by all monomers within the ( )m being in a second linear subsequence followed by the monomers within the ( )p being in a third linear subsequence; they are shown that way to indicate there n, m and p numbers of the three monomers. Rather, the three monomers may be arranged in a linear sequence with (a) all n type monomers in one subsequence, all m type monomers in a second subsequence and all the p type monomers in a third subsequence, (b) in an alternating sequence, (c) in other regular repeating sequences or (d) in random sequence.

Samples having the structure:

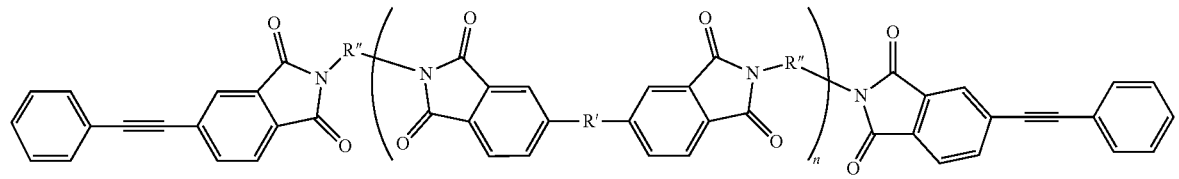

where R' was:

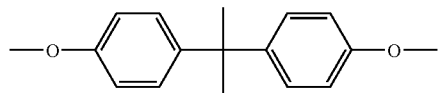

and where some R" groups were (A):

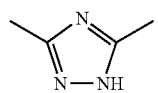

and some R" groups were (B):

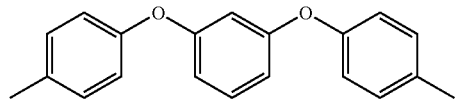

and n was consistent with the listed molecular weights in TABLE III were prepared and the properties indicated in Table III were measured.

TABLE III

| SAMPLE | R" = % A | R" = % B | Mol. Wt (Daltons) | Poly-Dispersity Index (PDI) | $T_g$ (° C.) uncured | $T_g$ (° C.) cured | $T_g$ (° C.) TRIS-2 |
|---|---|---|---|---|---|---|---|
| #1 | 10 | 90 | 7700 | 1.4 | 168 | 198 | 216 |
| #2 | 30 | 70 | 6000 | 1.3 | 178 | 223 | 246 |

Table III indicates that that varying the amount of hydrogen-bonding linker moieties incorporated into the backbone of the polyimide oligomer allows tuning of such physical properties as the glass transition temperature $T_g$. Similarly, melt viscosity, modulus and shape memory of the cured polyimide resins can be tuned. The last column gives the $T_g$ after curing uncured samples #1 and #2 with 30% by weight of the reactive diluent TRIS-2, structure (XXIV).

Samples having the structure:

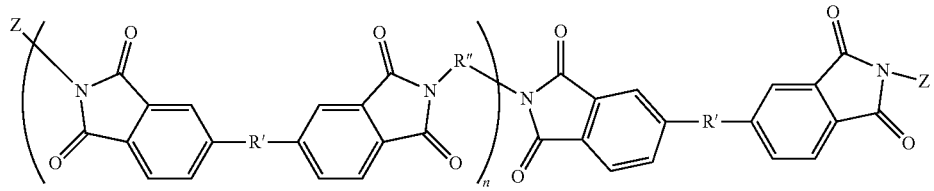

where R' was:

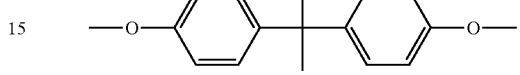

where Z was:

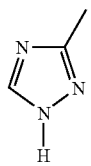

where some R" groups were (A):

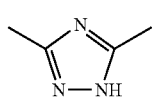

and some R" groups were (B):

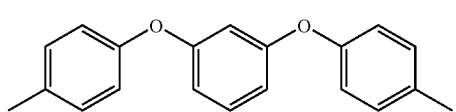

or (C):

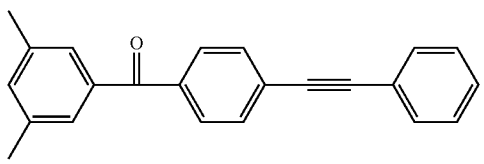

and n was consistent with the listed molecular weights in TABLE IV were prepared and the properties indicated in Table IV were measured.

TABLE IV

| SAMPLE | R" = % A | R" = % B | R" = % C | Mol. Wt Daltons | PDI |
|---|---|---|---|---|---|
| #3 | 80 | 0 | 20 | 8000 | 1.7 |
| #4 | 0 | 80 | 20 | 7900 | 1.8 |

Table IV indicates that incorporation of hydrogen-bonding linker moieties at the terminal ends of the polyimide oligomer allows the cured polyimide resin to act as a high molecular weight oligomer. However, upon heating the effective molecular weight of the resin is reduced.

TGA studies of polyimide resins of the embodiments of the present invention confirmed that the incorporation of 2,4-diaminotriazole (a backbone hydrogen bonding cross linker) did not reduce the thermal stability of the oligomer compared to the standard polyimide resins incorporating only backbone covalent bonding linkers.

The hydrogen bonding of polyimide resins of the embodiments of the present invention was studied by variable temperature FT-IR. IR transparent silicon wafers were coated with 500 nm of a polyimide oligomer with 30% of the repeat units containing the hydrogen bonding triazole moiety and the films were cross-linked at 300° C. to about 350° C. IR spectra were taken over the temperature range of 50 to 200° C. At temperatures below 80° C., a broad signal at 3481 wave numbers was observed due to the N—H of the triazole moiety. As the temperature increased, this signal shifted to 3496 wave numbers at 90° C. indicating dissociation of the hydrogen bond.

The nature of the hydrogen bonding of polyimide resins of the embodiments of the present invention was also studied by dynamic mechanical analysis. In addition to a large change in modulus observed at the glass transition of the oligomer, a low intensity relaxation was observed at about 105° C. to about 110° C. for samples containing 25% of the hydrogen-bonding moiety. A local maximum in the tan delta (ratio of the loss modulus to the storage modulus of the oligomer) was observed, which is believed to result form the dissociation of the hydrogen bonds in the sample. This feature becomes more pronounced with increasing hydrogen bonding moiety content.

Figure 3:
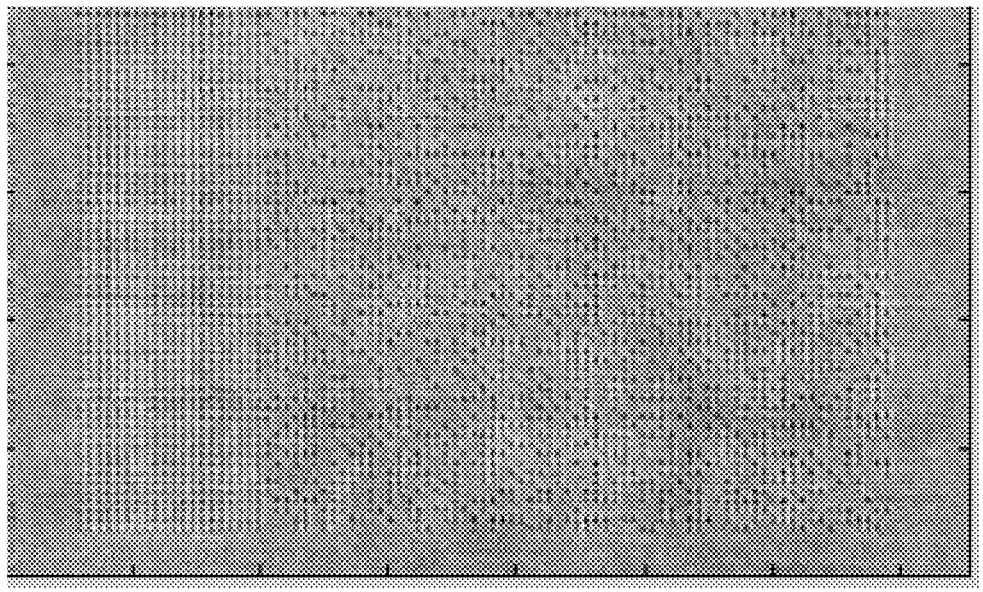
FIG. 3 is a scanning force microscopy (SFM) image recorded using thermo-mechanical sensing of a layer of polyimide resin formulated according to an embodiment of the present invention after a writing operation.
Figure 4:
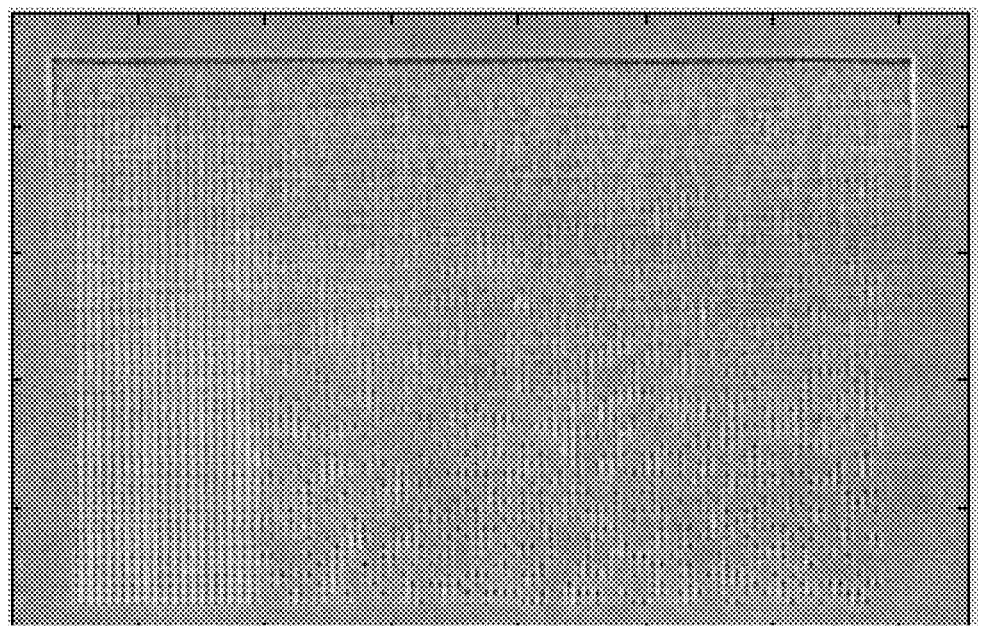
FIG. 4 is an SFM image recorded using thermo-mechanical sensing of the layer of polyimide resin of FIG. 3 after an erasing operation.

Write and erase studies were performed using sample #2 described supra to which end FIG. 3 is an SFM image recorded using thermo-mechanical sensing of a layer of polyimide resin formulated according to an embodiment of the present invention after a writing operation and FIG. 4 is an SFM image recorded using thermo-mechanical sensing of the layer of polyimide resin of FIG. 3 after an erasing operation.

In FIG. 3, data were written with a signal-to-distortion (SDR) ratio of about 10 dB at densities of about 600 Gb/inch². In FIG. 4, the temperature of the erasing tip varies from about 200° C. to about 550° C. from the bottom to the top of the micrograph.

Thus, the embodiments of the present invention provide data storage and imaging methodologies that operate in the nanometer regime.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A composition of matter, comprising:

polyimide oligomers comprising covalently bonded monomers, said monomers forming a backbone, said polyimide oligomers thermally stable to at least 400° C.;

one or more covalent bonding cross-linking moieties incorporated into said polyimide oligomers;

one or more hydrogen bonding cross-linking moieties incorporated into said polyimide oligomers; and wherein (i) said covalent bonding cross-linking moieties are located along said backbone and have the structure:

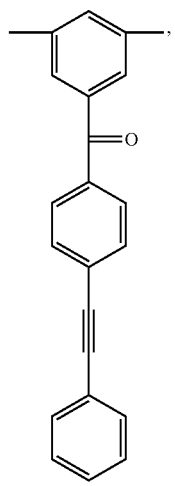

or (ii) said covalent bonding cross-linking moieties are located at terminal ends of said backbone and have the structure:

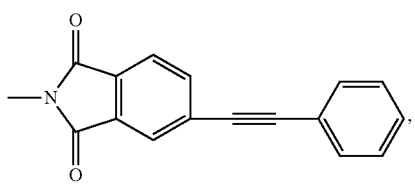 [SMILES: CN1C(=O)c2ccc(C#Cc3ccccc3)cc2C1=O]

or
 (iii) said composition further including a reactive diluent.

2. A method, comprising:
pushing a probe, heated to at least 100° C., into a cross-linked resin layer formed by curing a layer of a composition comprising:
 polyimide oligomers comprising covalently bonded monomers, said monomers forming a backbone, said polyimide oligomers thermally stable to at least 400° C.;
 one or more covalent bonding cross-linking moieties incorporated into said polyimide oligomers;
 one or more hydrogen bonding cross-linking moieties incorporated into said polyimide oligomers;
 wherein (i) said covalent bonding cross-linking moieties are located along said backbone and have the structure:

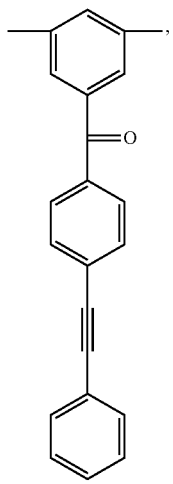

or
 (ii) said covalent bonding cross-linking moieties are located at terminal ends of said backbone and have the structure:

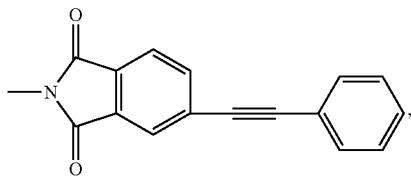 [SMILES: CN1C(=O)c2ccc(C#Cc3ccccc3)cc2C1=O]

or
 (iii) said composition further including a reactive diluent, wherein said polyimide oligomers are covalently cross-linked by reactive diluent groups derived from said reactive diluent during said curing; and
removing said probe from said resin layer, resulting in formation of a deformed region in said resin layer.

3. The method of claim 2, wherein after said curing, said resin layer is cross-linked by said covalent bonding cross-linking moieties.

4. The method of claim 2 further including:
 bringing said thermal-mechanical probe into proximity with said cross-linked resin layer multiple times to induce multiple deformed regions at points in said resin layer to write information in said resin layer.

5. The method of claim 4, further including:
 bringing said thermal-mechanical probe into proximity with said points in said resin layer to read said information.

6. The method of claim 5, further including:
 bringing said thermal-mechanical probe into proximity with one or more of said deformed regions in said resin layer, said thermal mechanical probe heating said one or more of said deformed regions to above about 100° C. to deform said one or more of said deformed regions in such a way as to eliminate said one or more deformed regions to erase said information.

7. The method of claim 6, further including:
 repeatedly writing, reading and erasing information at said points in said resin layer.

8. The method of claim 2, wherein said one or more hydrogen bonding cross-linking moieties are located along said backbone.

9. The method of claim 2, wherein said one or more hydrogen bonding cross-linking moieties are selected from the group consisting of

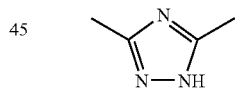

and moieties derived from imidazolyl, pyrazolyl, pyrazinyl, pyrimidinyl, pyridazinyl indazoyl, purinyl, phthalazinyl, naphthyridinyl, quinoxalinyl, quinazolinyl, 1,2,3-triazolyl, 1,2,4-triazolyl thiazolyl, isothiazolyl 1,3,5-triazinyl, 1,2,4-triazinyl, 1,2,3-triazinyl, pyrido[3,4-b]-pyridinyl, pyrido[3,2-b]-pyridinyl, pyrido[4,3-b]pyridinyl, purinyl, cinnolinyl, pteridinyl, beta-carbolinyl, phenazinyl, 1,7-phenanthrolinyl, 1,10-phenanthrolinyl, 4,7-phenanthrolinyl, phenarsazinyl, isothiazolyl, thienyl, and thianthrenyl imide.

10. The method of claim 2, whereon said one or more hydrogen bonding cross-linking moieties are located at terminal ends of said backbone.

11. The method of claim 10, wherein said one or more hydrogen bonding cross-linking moieties are selected from the group consisting of

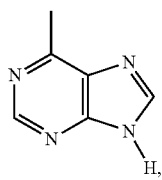
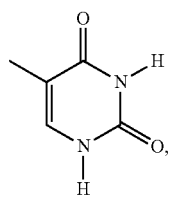
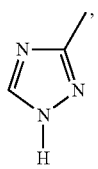

moieties derived from 3,5-diamino-1,2,4-triazole, 2,6-diaminopurine, 2,6-diamino-8-purinol, 2,3-diaminopyridine, unsaturated heterocyclic diamines derived by reduction of 2-amino-6-nitrobenzothiazole, 2-amino-5-(4-nitrophenylsulfonyl)thiazole, 2-amino-5-nitropyrimidine, 2-amino-5-nitrothiazole, or 3-amino-4-pyrazole carbonitrile, and moieties derived from ammonia amination of 2-amino-5-bromopyrimidine, 2-amino-5-bromothiazole, 2-amino-4-chlorobenzothiazole, 2-amino-6-chlorobenzothiazole, 2-amino-4-(4-chlorophenyl)thiazole, 2-amino-6-chloropurine, or 2-amino-6-fluorobenzothiazole.

12. The method of claim 2, wherein said reactive diluent is selected from the group consisting of consisting of:

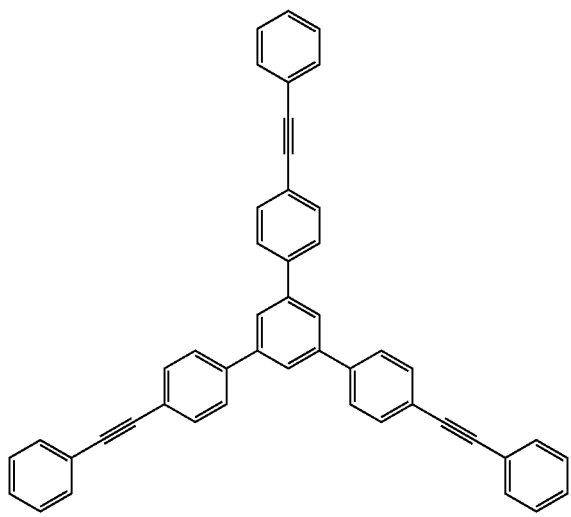

and

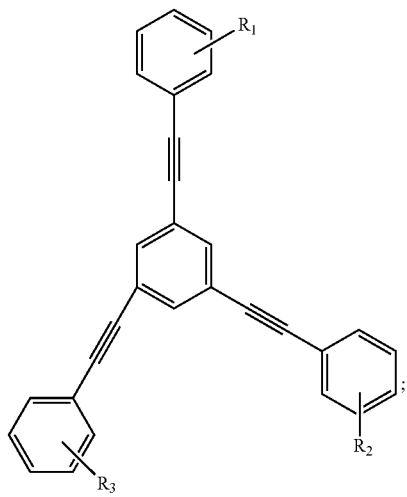

and where $R_1$, $R_2$ and $R_3$ are each independently selected from the group consisting of hydrogen, alkyl groups, aryl groups, cycloalkyl groups, alkoxy groups, aryloxy groups, alkylamino groups, arylamino groups, alkylarylamino groups, and arylthio, alkylthio groups.

13. The method of claim 2, including:

pushing said probe heated to at least 100° C. into said cross-linked resin layer multiple times to induce multiple deformed regions at points in said resin layer to write information in said resin layer.

14. A method, comprising:

pushing a probe, heated to at least 100° C., into a cross-linked resin layer formed by curing a layer of oligomers;

removing said probe from said resin layer, resulting in formation of a deformed region in said resin layer; and wherein said oligomers having the structure:

(I)

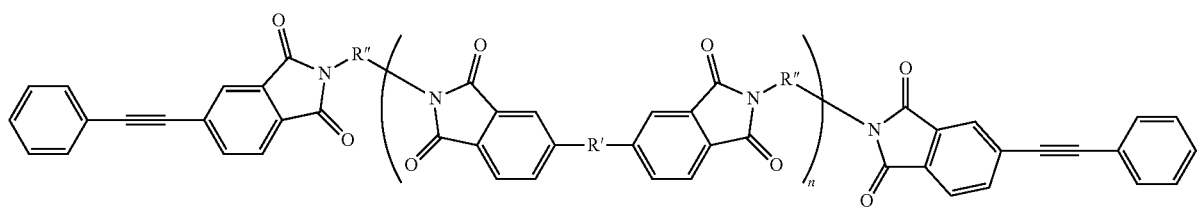

wherein R' is selected from the group consisting of

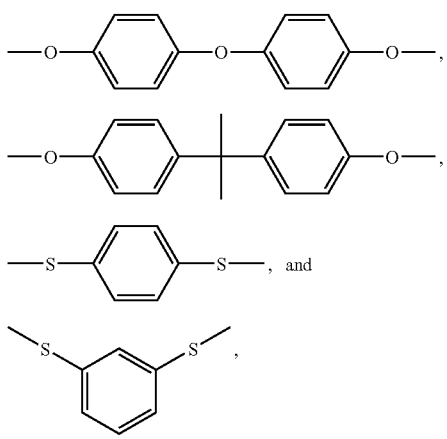

wherein at least one R" group is selected from a first group consisting of:

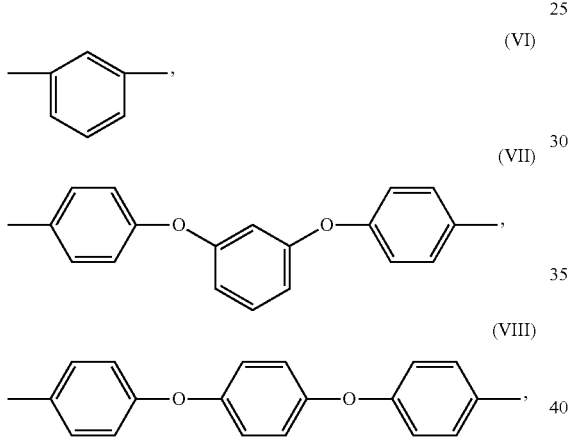

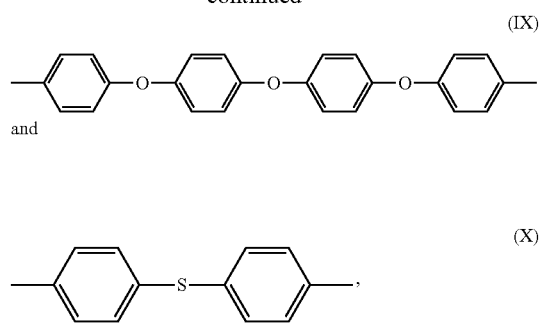

wherein at least one R" group is a hydrogen bonding cross-linking moiety selected from a second group consisting of:

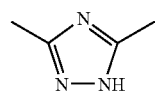

and moieties derived from imidazolyl, pyrazolyl, pyrazinyl, pyrimidinyl, pyridazinyl idazoyl, purinyl, phthalazinyl, naphthyridinyl, quinoxalinyl, quinazolinyl, 1,2,3-triazolyl, 1,2,4-triazolyl thiazolyl, isothiazolyl 1,3,5-triazinyl, 1,2,4-triazinyl, 1,2,3-triazinyl, pyrido[3,4-b]-pyridinyl, pyrido[3,2-b]-pyridinyl, pyrido[4,3-b]pyridinyl, purinyl, cinnolinyl, pteridinyl, beta-carbolinyl, phenazinyl, 1,7-phenanthrolinyl, 1,10-phenanthrolinyl, 4,7-phenanthrolinyl, phenarsazinyl, isothiazolyl, thienyl, and thianthrenyl imide;

wherein all R' groups are selected from said first and second groups; and wherein n is an integer from about 5 to about 50.

* * * * *